US010547451B2

(12) United States Patent
Peeters et al.

(10) Patent No.: US 10,547,451 B2
(45) Date of Patent: Jan. 28, 2020

(54) METHOD AND DEVICE FOR AUTHENTICATION

(71) Applicant: KATHOLIEKE UNIVERSITEIT LEUVEN, Leuven (BE)

(72) Inventors: Roel Johan Corneel Peeters, Leuven (BE); Jens Hermans, Leuven (BE)

(73) Assignee: NEXTAUTH NV, Leuven (BE)

( * ) Notice: Subject to any disclaimer, the term of this patent is extended or adjusted under 35 U.S.C. 154(b) by 221 days.

(21) Appl. No.: 15/531,099

(22) PCT Filed: Nov. 30, 2015

(86) PCT No.: PCT/EP2015/078077
§ 371 (c)(1),
(2) Date: May 26, 2017

(87) PCT Pub. No.: WO2016/083618
PCT Pub. Date: Jun. 2, 2016

(65) Prior Publication Data
US 2017/0331631 A1  Nov. 16, 2017

(30) Foreign Application Priority Data

Nov. 28, 2014 (GB) .................................. 1421130.4
Jan. 22, 2015 (GB) .................................. 1501071.3

(51) Int. Cl.
*H04L 29/06* (2006.01)
*H04L 9/32* (2006.01)
*H04L 9/08* (2006.01)

(52) U.S. Cl.
CPC .......... *H04L 9/3236* (2013.01); *H04L 9/0822* (2013.01); *H04L 9/0869* (2013.01); *H04L 9/3221* (2013.01); *H04L 9/3226* (2013.01); *H04L 9/3231* (2013.01); *H04L 63/0435* (2013.01)

(58) Field of Classification Search
CPC combination set(s) only.
See application file for complete search history.

(56) References Cited

U.S. PATENT DOCUMENTS

| 6,950,523 B1 | 9/2005 | Brickell et al. |
| 2002/0141575 A1 | 10/2002 | Hird |
| 2004/0003246 A1* | 1/2004 | Hopkins ............... H04L 9/0625 713/168 |

(Continued)

OTHER PUBLICATIONS

European Office Action, dated Jul. 26, 2017, for European Application No. 15801472.0.

(Continued)

*Primary Examiner* — Malcolm Cribbs
(74) *Attorney, Agent, or Firm* — Birch, Stewart, Kolasch & Birch, LLP (57) ABSTRACT

A method for authenticating a prover to a verifier, the prover being provided with a proving key paired to a verification key registered with the verifier, wherein the proving key can be obtained by transforming a protected key and a secret (S) using a transformation (E), characterized in that the prover stores the protected key and does not store the corresponding proving key nor the corresponding verification key in clear, with the exception of storage in transient memory.

19 Claims, 2 Drawing Sheets

(56) References Cited

U.S. PATENT DOCUMENTS

| | | | | |
|---|---|---|---|---|
| 2004/0148509 A1* | 7/2004 | Wu | ......................... | G06F 21/32 |
| | | | | 713/186 |
| 2005/0081041 A1 | 4/2005 | Hwang | | |
| 2008/0229103 A1* | 9/2008 | Mutka | ................. | H04L 63/0876 |
| | | | | 713/168 |
| 2010/0183148 A1* | 7/2010 | Bellwood | ............ | H04N 7/1675 |
| | | | | 380/44 |

OTHER PUBLICATIONS

International Search Report, issued in PCT/EP2015/078077, PCT/ISA/210, dated Feb. 15, 2016.
Written Opinion of the International Searching Authority, issued in PCT/EP2015/078077, PCT/ISA/237, dated Feb. 15, 2016.

* cited by examiner

METHOD AND DEVICE FOR AUTHENTICATION

FIELD OF THE INVENTION

The invention generally relates to user authentication using a secret and a device, specifically a method and device for two-factor or multi-factor authentication with an online verifier. The invention is characterized in that a compromise of either the secret or either the device storage does not imply a compromise of the authentication.

BACKGROUND OF THE INVENTION

Consider a system where a prover has to authenticate to a verifier. A typical way of achieving this is by the use of public key cryptography: the prover has a private key, only known to the prover and the verifier stores the corresponding public key. The public key thus acts as verification key and the private key as proving key. Using a cryptographic authentication protocol (for example the protocols from ISO/IEC 9798-3 or ISO/IEC 9798-5) or a secure connection (set up using a key establishment protocol e.g. SSL/TLS, ISO/IEC 10117-3) the prover authenticates to the verifier.

A problem often encountered in such systems is the storage of the private key. In systems where the prover is associated with a specific user, this user often has to enter a weak secret (e.g. a password or PIN-code) as part of the authentication process to ensure proper approval by the user. There are currently several options for the system to use this weak secret:

- the weak secret is sent to the verifier (e.g. over a secure connection or using some type of key wrapping mechanism). The verifier stores a database of weak secrets (in plain or protected form). The verifier performs the verification of the weak secret. Depending on the storage used, the verifier either has access to the weak secret directly or the weak secret is easy to brute force. Especially in the case of short PIN codes the number of possible PIN codes is extremely limited, allowing for a fast brute force.
- A password based authentication protocol is used. Again this requires the verifier to store the weak secret for comparison.
- The weak secret is used to encapsulate the private key on the prover side. Existing encapsulation mechanism (e.g. disk encryption, key wrapping) all offer key integrity. If an incorrect weak secret is entered the de-encapsulation method detects this and reports an error. This can be done directly, by a specific function of the de-encapsulation method or indirectly, by noticing that the output after de-encapsulation is not a correctly formatted private key. Clearly this creates an issue as it is possible to brute force the weak secret and hence the private key after obtaining the encapsulated private key.

To solve the above issues, there is a need for a novel approach and device for authentication.

SUMMARY OF THE INVENTION

A need still exists for an improved device and method for authentication. These objectives are met by the device according to the independent claims of the present invention. The dependent claims relate to preferred embodiments.

The present invention provides a method and device for authentication, comprising a prover and a verifier. A proving key stored in the prover is protected using a secret (e.g. a password, PIN code, and/or biometric sample (e.g. fingerprint, retina-scan, voice recognition)). Instead of storing the proving key in plain, a protected key is stored, which, upon providing the correct secret, can be transformed into the original proving key. When an incorrect secret is provided, the protected key is recovered into a different proving key. The recovered key is used as part of an authentication protocol between prover and verifier, based on e.g. public key cryptography or symmetric cryptography. An incorrect secret will result in a proving key that is or looks correctly formatted, making it impossible for the prover on its own to determine the correctness. The verifier can lock out the prover from further authentication after a number of failed authentication attempts.

The authentication protocol can be arranged such that the recovered proving key itself is not made knowable to the verifier. The authentication protocol may be arranged such that the verifier cannot learn the proving key from observing the protocol. The authentication protocol may be arranged to prevent the verifier from gaining knowledge of the proving key. The recovered proving key can e.g. be used to put a signature in the authentication protocol or be used as secret in a zero-knowledge protocol (e.g. Schnorr).

The present invention provides methods for authenticating a prover to a verifier, the prover being provided with a proving key paired to a verification key registered with the verifier, wherein the proving key can be obtained by transforming a protected key and a secret (S) using a transformation (E), characterized in that the prover stores the protected key but does not store the proving key nor the verification key in clear, unless in transient memory. The secret is not stored, or only in transient memory, and input on demand.

Preferably, the methods can be computer implemented methods.

The prover herein is also referred to as prover device. The verifier herein is also referred to as verifier device.

Optionally, the invention provides for a method for authenticating a prover device to a verifier device. The prover device includes a non-volatile memory storing a protected key. The prover device includes an input unit arranged for receiving a secret (S) to be input by a user. The user herein is also referred to as the prover. The user inputs the secret into the prover device. The secret is not stored in the prover device, or only in transient memory. The prover device includes a processing unit arranged for transforming the protected key into a proving key using a transformation (E) and the secret (S). The proving key is paired to a verification key registered with the verifier device. The prover device does not store the proving key nor the verification key in clear, unless in transient memory.

The transformation (E) can be such that when the correct secret (S) is provided, the proving key is constructed from the protected key and when an incorrect secret (S') is provided, a different proving key is constructed from the protected key. Preferably, the different proving key is not paired to a verification key registered with the verifier. Hence, regardless of the secret used in constructing the proving key, a proving key is constructed. Only when the correct secret is used, the resulting proving key is the proving key paired to the verification key registered with the verifier. Preferably said secret (S) can be a weak or strong secret. Preferably, the prover is arranged for constructing the proving key without communication with an external device, such as a remote server.

Preferably, the different proving key resulting from an incorrect secret is indistinguishable from the correct proving key for anyone without access to the verification key or to an entity performing verification operations using the verification key.

It is noted that instances are known in which a proving key resulting from an incorrect secret looks like a potentially correct proving key when considering the exterior appearance of the proving key, while it is still possible to assess that said proving key does not comply with the required criteria for a potentially correct proving key. In such case, it can be assessed that the resulting proving key must be an incorrect proving key, e.g. by computational analysis.

For example, it is known to protect an RSA (Rivest, Shamir, Adleman) private key (modulus and exponent) by encrypting it with a key derived from a user password. The prover stores only the encrypted private key, whereas the verifier stores the corresponding RSA public key. Upon inputting a password, the prover will try to recover the RSA private key. When inputting an incorrect password the decrypted modulus will be incorrect. However, there is very high likelihood that the decrypted modulus cannot even be correct. The modulus typically needs to be the product of two large primes, which is unlikely for the decryption with an incorrect password: the vast majority of incorrect moduli will have trivial divisors. As such, such incorrect modulus can be excluded from consideration as being inherently incorrect since it can be computationally proven that it does not satisfy the criteria for a potentially correct modulus. Note for instance that more or less half of the moduli decrypted using an incorrect password will be divisible by two. It can easily be demonstrated that the chance that a random number (such as the decrypted modulus from an incorrect password) is not divisible by any prime between 1-1,000 is ≤8.1%. Similarly, the chance that such a random number is not divisible by any prime between 1-10,000 is ≤6.1%; the chance that such a random number is not divisible by any prime between 1-100,000 is ≤4.9%; the chance that such a random number is not divisible by any prime between 1-10,000,000 is ≤3.5%; the chance that such a random number is not divisible by any prime between 1-100,000,000 is ≤3.1%. Thus a large ratio of such random numbers can be easily identified by trial division as not satisfying the requirement that the modulus needs to be the product of two large primes.

Hence, it is possible to dismiss a large ratio of incorrect proving keys as clearly incorrect without testing the proving key with use of the verifier. For example, by trying all random PIN-codes of four digits, the number of possibly correct proving keys can be reduced to approximately 300 candidates, when checking the modulus for divisibility by all primes between 1 and $10^8$. The number of candidates can even be further reduced by using more computation or by using a better performing factoring algorithm than trial division. Hence, the incorrect proving keys are to a large degree distinguishable from the correct proving key, even without access to the verification key or to an entity performing verification operations using the verification key. Therefore, such known method can be vulnerable to a local brute force attack on the prover, as it is trivial to determine if the resulting modulus can be correct.

Therefore, preferably the proving keys generated when using an incorrect secret are arranged such that at least 50% of these proving keys cannot be computationally proven to not satisfy the criteria for a potentially correct proving key. The set of proving keys generated when using all possible incorrect secret is arranged such that at least 50% of these proving keys can be computationally proven to satisfy the criteria for a potentially correct proving key. More preferably, the percentage is 75%, even more preferably 90%. This provides the advantage that the different proving key resulting from an incorrect secret is reliably computationally indistinguishable from the correct proving key for anyone without access to the verification key or to an entity performing verification operations using the verification key. Brute forcing is efficiently prevented since at least 50% of the retrieved proving keys would have to be tested for correctness with access to the verification key or to an entity performing verification operations using the verification key.

The set of proving keys generated when using all possible incorrect secrets is arranged such that at least 50% of these proving keys satisfy the criteria for a potentially correct proving key. A proving key generated when using an incorrect secret thus has a chance of at least 50% of satisfying the criteria for a potentially correct proving key. Thus, at least 50% of the proving keys generated on the basis of an incorrect secret cannot be excluded as being inherently incorrect proving keys. More preferably, the percentage is 75%, even more preferably 90%. This provides the advantage that the different proving key resulting from an incorrect secret is statistically reliably indistinguishable from the correct proving key for anyone without access to the verification key or to an entity performing verification operations using the verification key. Brute forcing is efficiently prevented since at least 50% of the retrieved proving keys would have to be tested for correctness with access to the verification key or to an entity performing verification operations using the verification key.

It will be appreciated that most desirably all (100%) possible proving keys generated when using an incorrect secret satisfy the criteria for a potentially correct proving key, e.g. can be computationally proven to satisfy these criteria. This may not be required for acceptable security, however. This provides the advantage that the different proving key resulting from an incorrect secret is computationally indistinguishable from the correct proving key for anyone without access to the verification key or to an entity performing verification operations using the verification key.

Hence, preferably, the transformation E is arranged such that it, when using an incorrect secret, generates a proving key having a chance of at least 50% of satisfying the criteria for a potentially correct proving key, more preferably at least 75%, even more preferably at least 90%. Optionally, the transformation E is arranged such that it, when using an incorrect secret, always generates a proving key satisfying the criteria for a potentially correct proving key.

Instead of entering a PIN or password, two-factor authentication can also be achieved by asking the user to input a biometric sample like for example a fingerprint, retina-scan, face print, voice sample, handwritten signature, body sensors. Typically, biometric samples are not directly used a secret, but the secret is rather derived from the biometric sample combined with additional data that needs to be stored, e.g., in the form of helper data. These helper data ensure that, for the same user, the biometric sample given during enrolment and authentication can be used to derive the same output.

One may consider an identity token, such as for example eID card or ePassport, or smartphone application providing eID or ePassport functionalities. During enrolment (possibly within a trusted setup) the user's biometric sample can be captured, possibly with some additional helper data. By using this biometric (possibly in combination with helper data), a verifier can later verify the biometric without the user needing to disclose it to the verifier. The verifier can establish that the presented identity token corresponds to the user presenting it by making the link with his or her biometrics. This could also be used for remote verification of biometrics.

In further preferred embodiments the transformation (E) takes additional inputs. Preferably, the additional inputs are all stored in memory of the prover device, or are input at the prover device. Hence, no communication of the prover device with an external device, e.g. an external server, is necessary for constructing the prover key. The additional input may e.g. relate to a biometric sample, such as a fingerprint.

The method may include multi-factor authentication, such as three factor authentication. The transformation (E) may be arranged for recovering the proving key using the protected key, the secret (e.g. a PIN-code or password), and a biometric sample (e.g. fingerprint, retina-scan, voice recognition). The transformation (E) may be arranged for recovering the proving key using the protected key, the secret, a biometric sample, and additional data.

One may consider identity tokens that require multi-factor authentication, such as 3-factor authentication, by supplying the secret being a something the user knows, e.g. PIN or password to the transformation and putting something the user is, e.g. the biometric sample (possibly combined with helper data) as additional data into the transformation.

The transformation (E) can be such that, regardless of the correctness of the secret (S), it results in a proving key that can be securely used in the authentication protocol (e.g. the proving key should not be 'weak'). Such requirements might include:
- a sufficient entropy for the resulting proving key when assuming a random protected key or a protected key resulting from the inverse transformation of a random key, even with an incorrect secret;
- computational or information theoretic indistinguishability of the proving key from a random key, when no access is given to the protected key;
- computational indistinguishability of the proving key, resulting from the transformation of a random protected key under a known fixed secret, from a random key;
- statistical indistinguishability of the distribution of proving keys, taken e.g. over the set of protected keys and/or over the set of secrets, from the distribution of random keys;
- unlinkability of proving keys originating from the same protected key but different secrets; and/or
- irreversibility of the transformation E, thus preventing recovery of the secret and/or protected key from a proving key.

The proposed transformations satisfy several of the aforementioned requirements, several of the transformations even when using a weak secret.

The transformation (E) can be such that an adversary with access to the protected key, limited access to the verification key (e.g. through a number of authentication attempts at the verifier) and access to the authentication protocol taking place between a legitimate prover and verifier cannot find the correct proving key. In addition the adversary should not be able to authenticate itself to the verifier as if it possessed the proving key.

In preferred embodiments the transformation (E) is a symmetric encryption algorithm using the secret as key and the protected key as data. In embodiments of the present invention the transformation E is adapted to use any function (e.g. XOR, concatenation, symmetric encryption, MAC, hash, PRF . . . ) of the secret and optionally additional inputs as key.

In preferred embodiments, the transformation E is a symmetric encryption algorithm using the protected key as key and the secret as data. Preferably the data is a function of the secret and optionally additional data.

In preferred embodiments the transformation E is a symmetric encryption algorithm using any function of the secret, protected key and/or additional data as key, and any function of the secret, protected key, and/or additional data as data.

In preferred embodiments the symmetric encryption is replaced with a MAC, symmetric decryption or a pseudo-random function (PRF).

In further preferred embodiments the transformation E is a hash function, using any function of the protected key, secret and/or additional data as input.

In preferred embodiments the transformation E is any function (e.g. XOR, concatenation, symmetric encryption, PRF) taking as inputs the output of any of the above transformations, and optionally additional data.

In preferred embodiments the transformation E is a key generation function or key derivation function, taking as input the output of any of the above transformations, where the proving key is generated/derived from the output of the transformation.

In preferred embodiments the transformation E generates an intermediate key using the protected key and a secret (S), and uses the intermediate key as seed for generating a proving key.

The intermediate key may be a non-structured key while the proving key may be a structured key. This may provide that when using an incorrect secret the proving key satisfies the criteria for a potentially correct proving key, or at least has a chance of at least 50% of satisfying these criteria.

In preferred embodiments the transformation E is a key generation algorithm, using the output of any of the above transformations as seed for a random number generator used during key generation.

In further preferred embodiments the transformation E is a function using a combination of the secret, protected key and/or additional data as inputs.

In preferred embodiments the transformation E is a combination of the transformations, as described above, according to other embodiments of the invention.

In preferred embodiments the method further comprises an inverse transformation E' that constructs the protected key from the proving key and the secret. Preferably the inverse transformation takes additional inputs. More specifically the inverse transformation is preferably any of the transformations specified above according to other embodiments of the invention, whereby the protected key is replaced by proving key.

In preferred embodiments the proving and verification key are used in an authentication protocol, whereby said authentication protocol is based on a shared key between prover and verifier or whereby said authentication protocol is based on a private key for the prover and a public key for the verifier. Preferably the proving key is different from the verifying key.

In further preferred embodiments the verifier blocks access of the prover after one or more failed authentication attempts. The verifier can e.g. block access for a predetermined amount of time, e.g. one hour. Alternatively, or additionally, the verifier can send a message, e.g. text message such as a warning email, or audio message such as a telephone message, to the prover for informing about the failed authentication attempt(s). It is also possible that the verifier sends such message to an alternative device associated with the user of the prover.

In another aspect the present invention provides prover devices adapted to perform the methods according to embodiments of the invention.

In a further aspect the present invention provides authentication systems comprising a prover device and verifier device. The prover device comprises a memory, e.g. a non-transitory memory, and a processing unit, wherein the memory stores a protected key. The processing unit is arranged for transforming the protected key using a transformation (E) and a secret (S) into a proving key, such that when the correct secret (S) is used, the constructed proving key is the proving key paired with a verification key registered with the verifier device, and that when an incorrect secret (S') is provided a different proving key is constructed. The proving device is arranged such that neither the proving key nor the verification key is stored in clear, with the exception of storage in transient memory. The verifier device can include a processing unit arranged for determining whether a proving key generated by the prover device is a proving key paired with a verification key registered with the verifier device. It will be appreciated that the proving key may be provided, e.g. transmitted to the verifier device. It will be appreciated that it is also possible that data representative of the proving key is provided, e.g. transmitted, to the verifier device.

In an aspect the present invention provides prover devices, comprising a memory, e.g. a non-transitory memory, and a processing unit. The memory stores a protected key. The processing unit is arranged for transforming the protected key using a transformation (E) and a secret (S) into a proving key, such that when the correct secret (S) is used, the constructed proving key is the proving key paired with a verification key, and that when an incorrect secret (S') is provided a different proving key is constructed. The device is arranged such that neither the proving key nor the verification key is stored in clear, with the exception of storage in transient memory.

It will be appreciated that the processing unit of the prover device can be arranged for performing at least part of the methods as described herein. It will be appreciated that the processing unit of the verifier device can be arranged for performing at least part of the methods as described herein.

In an aspect, the invention provides a computer program product including computer implementable instructions which when implemented by a programmable computer cause the computer to perform the method as described herein. In a further aspect, the invention provides a non-transitory computer readable medium storing computer implementable instructions which when implemented by a programmable computer cause the computer to perform the method as described herein.

It will be appreciated that any of the aspects and/or embodiments of the invention can be combined. It will also be clear that all features and advantages mentioned in view of the method apply equally to the prover devices and/or authentication system, and vice versa.

Particular and preferred aspects of the invention are set out in the accompanying independent and dependent claims. Features from the dependent claims may be combined with features of the independent claims and with features of other dependent claims as appropriate and not merely as explicitly set out in the claims.

BRIEF DESCRIPTION OF THE DRAWINGS

Further features of the present invention will become apparent from the examples and figures, wherein.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein. In the drawings, like reference numerals indicate like features; and, a reference numeral appearing in more than one figure refers to the same element. The drawing and the following detailed descriptions shows specific embodiments of a method and device for authentication according to the present invention.

The present invention advantageously protects against brute forcing on both the prover and verifier side and it does not require storage of the secret on either the verifier or prover. All the examples of the present invention provided below have in common that only a protected key is stored on the prover. The protected key can be stored in non-volatile memory. The verifier only stores the corresponding verification key. The verification key can be stored in non-volatile memory. The method for converting the protected key into the proving key is such that it is not possible to detect when an incorrect secret was entered, i.e. the output will, regardless of the secret, always be a correctly formatted proving key. The only way to verify whether the combination of the secret and protected proving key is correct is to execute the authentication protocol with the verifier. If the correct proving key was obtained (e.g. with the correct secret), the verifier will have the corresponding verification key and the authentication protocol will succeed. Otherwise the verifier will have no matching verification key and the authentication will fail.

Figure 1:
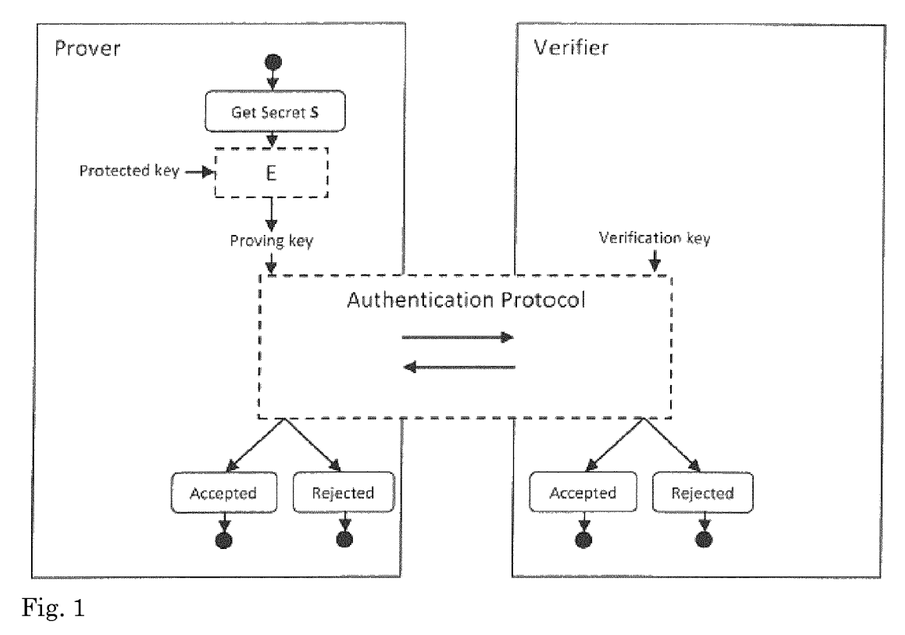
FIG. 1 schematically illustrates the authentication protocol according to embodiments of the invention.
Figure 2:
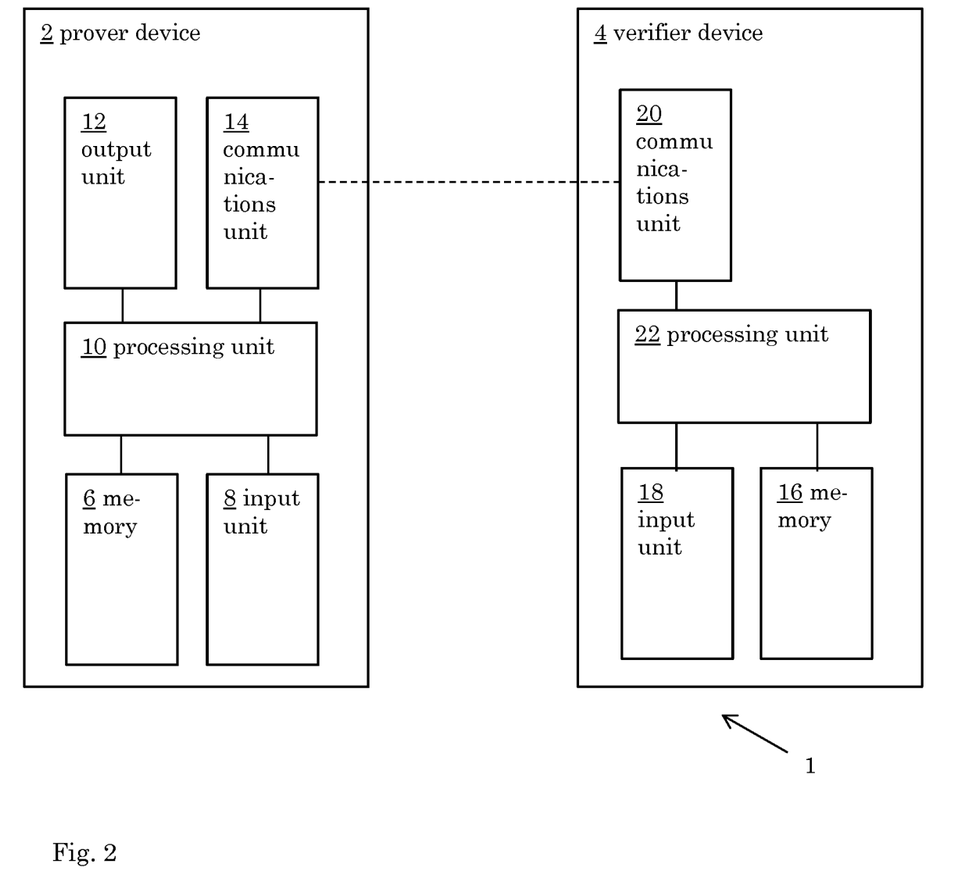
FIG. 2 schematically illustrates an embodiment of a system according to the invention.

FIG. 2 shows a schematic representation of a system 1. The system 1 includes a prover device 2. The prover device 2 can be a telecommunications device and/or a multimedia device such as a smartphone, laptop, tablet or the like. The system 1 includes a verifier device 4. The verifier device can be a computer device, e.g. a server.

The prover device 2 includes a non-volatile memory 6. The prover device 2 includes an input unit 8, such as one or more of a keyboard, touchscreen, camera, microphone, or the like. The prover device can also be a dedicated device. The prover device 2 includes a processing unit 10. The prover device 2 can include an output unit 12, such as one or more of a display, a touchscreen, a speaker, or the like. The prover device can include a communications unit 14, e.g. for communicating with a network or other device.

The verifier device 4 includes a non-volatile memory 16. The verifier device 4 can include an input unit 18 and/or a communications unit 20 similar to that of the prover device. The verifier device 4 includes a processing unit 22.

The non-volatile memory 6 of the prover device 2 stores the protected key. The secret (S) can be input into the input unit 8 by a user. The secret is not stored in the prover device 2, or only in transient memory. The processing unit 10 transforms the protected key into a proving key using a transformation (E) and the secret (S). The communications unit 14 of the prover device 2 and the communications unit 20 of the verifier device 4 perform an authentication protocol. The processing unit 22 of the verifier device 4 determines whether or not the proving key generated by the prover device 2 is paired to a verification key registered with the verifier device 4. The prover device 2 does not store the proving key in clear, unless in transient memory. The verification key is preferably not at all stored in the prover device 2. The authentication protocol is preferably arranged such that the proving key itself is not made knowable to the verifier device 4.

Example 1: consider an authentication mechanism based on public/private keys, where the private keys are formatted such that any bit sequence of appropriate length is a correctly formatted private key. In this case, one can encrypt (e.g. using a block cipher in a certain mode) the private key using the weak secret to obtain the protected private key. The protected key can be stored in the non-volatile memory 6 of the prover device 2. Decrypting this protected key using the weak secret results in the original private key or in an incorrect, but correctly formatted, private key. Hence, anyone obtaining the protected private key cannot assess from the protected private key alone whether the decrypted private key is the original private key or another private key. Hence decrypting the protected private key with a guessed weak secret does not provide an indication whether the resulting decrypted private key is the original private key or not. As there is no feedback on the correctness of the decrypted private key (at least not without accessing the verifier), brute forcing is prevented.

As the weak secret would be a rather weak key for symmetric encryption, it can be made stronger by combining it with additional data (which the prover stores in plain), by passing it through a cryptographic hash function, a key derivation function, etc. The additional data can, for example, be random or pseudo-random data.

Example 2: instead of protecting the private key directly it is possible to generate the private key based on the weak secret and additional data (which the prover stores in clear). One way of achieving this, is by taking a cryptographic hash of the weak secret and the additional data and using this as entropy input for the key generator. In some cases key generation is not even necessary, i.e. when the private key is simply equal to the output of the hash function. Entering an incorrect weak secret, e.g. into the input unit 8, will result into a wrong but correctly formatted private key. Hence from the format of the generated private key it cannot be determined whether or not the generated private key is the original private key, since the format of the generated private key satisfies the criteria for a potentially correct private key.

Example 3: just as in example 2, one can use a cryptographic hash function combining the weak secret with additional data. Instead of using this output directly, it is first bitwise added (XOR) with an equally long bit string (the 'mask') which is stored in plain by the prover. The result is used as input to key generation or directly as private key. The advantage of this method is that it supports changing the weak secret.

For example, when changing the weak secret, a new mask is computed as the XOR of the cryptographic hash function with the original weak secret, the cryptographic hash function with the new weak secret and the existing mask. By replacing the old mask with the new, the weak secret is changed. This method can e.g. be used to change the PIN code for bank cards without having to store the PIN at the server or the card.

The same techniques can be used when using a symmetric setup instead of a private/public key. In this case both the verifier and prover will use the same key to execute a (symmetric key based) authentication protocol. The verifier stores the key in plain, the prover stores a protected key.

To protect against brute forcing by executing the authentication protocol with the verifier multiple times, the verifier should block the verification key after a number of failed attempts. In order to do so the verifier needs to know which verification key it should block, i.e. it has to know the identity of the prover. This can very easily be achieved by sending along in the authentication protocol an identification string which the prover and verifier share. Note that leakage of this identification string can only result in blockage of accounts, not in false authentications. A better way is the use of a (second) public/private key pair, which the prover uses first to authenticate to the verifier, after which a second authentication phase follows using the protected key.

In another example one can consider a prover device 2 embodied as a tablet computer that is used to authenticate to verifier device 4 embodied as a webserver through for instance an HTTPS connection. When the user clicks on the login button, an application will be triggered on the tablet computer (e.g. browser extension or a separate program) or on another device (e.g. an app on the smartphone of the user). The device running this application stores a protected key in permanent storage, which is paired (during registration on the website) with a verification key stored on the webserver. The application will ask for user confirmation by entering a password or PIN-code, which is used to recover a proving key from the stored protected key using the password or PIN-code. The application will now execute an authentication protocol directly with the webserver in order to authenticate the user on the website. Based on the verification key the webserver can determine whether the correct proving key was recovered, e.g. whether the combination of the password (or PIN-code) and the stored protected key was correct. In case of, in this example, three successive authentication failures, the webserver blocks further access for that user. It will be appreciated that the authentication protocol can be arranged such that the recovered proving key itself is not made knowable to the webserver.

In yet another example one may consider a smartphone with an app for mobile payments. The smartphone stores the protected key in permanent storage such that only the payment app can access it. When approaching a payment terminal, the terminal transfers to the smartphone, amongst others, an identifier of the transaction that is taking place. This transfer can be done through e.g. NFC, scanning a 2D barcode, Bluetooth, or the like. Upon receiving the transaction identifier the app will start authenticating to the payment backend server, e.g. through mobile internet. During authentication the app presents the user with the payment information and asks the user to enter the PIN-code. The PIN-code is used to reconstruct the proving key (e.g. using one of the transformations described in examples 1 to 3). The proving key is then used to e.g. put a signature in the authentication protocol or used as secret in a zero-knowledge protocol (e.g. Schnorr). The payment backend can then use the verification key to validate the signature or check the zero-knowledge protocol and either execute or deny the payment. Instead of, or addition to entering a PIN-code, the user may also be required to enter a biometric, such as a fingerprint.

It will be appreciated that the processing units can be embodied as dedicated electronic circuits, possibly including software code portions. The processing units can also be embodied as software code portions executed on, and e.g. stored in, a memory of, a programmable apparatus such as a computer, tablet or smartphone.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a non-transitory storage medium, such as a ROM, for example a CD ROM or a semiconductor ROM, or a magnetic recording medium, for example a floppy disc or hard disk or flash storage, for example a USB stick or SD card. Further, the carrier may be a transmissible carrier such as an electrical or optical signal which may be conveyed via electrical or optical cable or by radio or other means, e.g. via the internet or cloud.

When a program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described. It is to be understood that this invention is not limited to the particular features of the means and/or the process steps of the methods described as such means and methods may vary. It is also to be understood that the terminology used herein is for purposes of describing particular embodiments only, and is not intended to be limiting. It must be noted that, as used in the specification and the appended claims, the singular forms "a" "an" and "the" include singular and/or plural referents unless the context clearly dictates otherwise. It is also to be understood that plural forms include singular and/or plural referents unless the context clearly dictates otherwise. It is moreover to be understood that, in case parameter ranges are given which are delimited by numeric values, the ranges are deemed to include these limitation values. The mere fact that certain measures are recited in mutually different claims does not indicate that a combination of these measures cannot be used to an advantage.

The invention claimed is:

1. A computer implemented method for authenticating a prover to a verifier, the prover being provided with a proving key paired to a verification key registered with the verifier, wherein the proving key is obtained by transforming a protected key and a secret using a transformation,
   wherein the prover stores the protected key and does not store the corresponding proving key nor the corresponding verification key in clear, with the exception of storage in transient memory,
   wherein the transformation is configured such that:
      when the correct secret is provided, the proving key is constructed from the protected key; and
      when an incorrect secret is provided, a different proving key is constructed from the protected key,
   wherein the different proving key has a format of a potentially correct proving key,
   wherein the proving key or different proving key is obtained directly from the transformation, and
   wherein the transformation is at least one of:
   a) a symmetric encryption algorithm using any function of one or more of the secret, the protected key and additional data as a key input,
   b) a symmetric encryption algorithm using any function of one or more of the secret, the protected key and additional data as a data input,
   c) a symmetric encryption algorithm using the secret as a key input and the protected key as a data input,
   d) a symmetric encryption algorithm using the protected key as a key input and the secret as a data input,
   e) adapted to use exclusive OR (XOR), concatenation, symmetric encryption, message authentication code (MAC), hash, or pseudo-random function (PRF) of the secret as a key input, and
   f) a hash function, using any function of one or more of the protected key, the secret and additional data as input.

2. The method of claim 1, wherein the different proving key resulting from an incorrect secret is indistinguishable from the correct proving key for anyone without access to the verification key or to an entity performing verification operations using the verification key.

3. The method of claim 1, wherein a set of possible proving keys generated when using an incorrect secret is arranged such that at least 50% of these proving keys satisfy criteria for a potentially correct proving key.

4. The method of claim 1, wherein the different proving key generated when using an incorrect secret has a chance of at least 50% of satisfying the criteria for a potentially correct proving key.

5. The method of claim 1, wherein said secret is a weak or strong secret.

6. The method of claim 1, wherein said secret is derived from a biometric sample, or the biometric sample combined with additional inputs.

7. The method of claim 1, wherein the transformation takes additional inputs.

8. The method of claim 1, wherein the prover constructs the proving key without communication with an external device.

9. The method of claim 1, wherein the symmetric encryption is replaced with a MAC, symmetric decryption or a pseudo-random function.

10. The method of claim 1, wherein the transformation is any function of XOR, concatenation, symmetric encryption, and PRF, taking as inputs the output of any of the above transformations, and optionally additional data.

11. The method of claim 1, further comprising an inverse transformation that constructs the protected key from the proving key and the secret.

12. The method of claim 11, wherein the inverse transformation takes additional inputs.

13. The method of claim 11, wherein the inverse transformation is at least one of:
    a) function using one or more of the secret, the protected key and additional data as inputs,
    b) a symmetric encryption algorithm using any function of one or more of the secret, the protected key and additional data as a key input,
    c) a symmetric encryption algorithm using any function of one or more of the secret, the protected key and additional data as a data input,
    d) a symmetric encryption algorithm using the secret as a key input and the protected key as a data input,
    e) a symmetric encryption algorithm using the protected key as a key input and the secret as a data input,
    f) adapted to use XOR, concatenation, symmetric encryption, MAC, hash, PRF of the secret as a key input, and
    g) a hash function, using any function of one or more of the protected key, the secret and additional data as input,
    and
    wherein the protected key is replaced by the proving key.

14. The method of claim 1, wherein the proving and verification key are used in an authentication protocol, said authentication protocol is based on a shared key between prover and verifier, or said authentication protocol is based on a private key for the prover and a public key for the verifier.

15. The method of claim 1, wherein the proving key is used in an authentication protocol, and the proving key is used to put a signature in the authentication protocol or is used as secret in a zero-knowledge protocol.

16. The method of claim 1, wherein the verifier blocks access of the prover after one or more failed authentication attempts.

17. A prover device comprising a memory and a processing unit, wherein the memory stores a protected key, wherein the processing unit is arranged for transforming the protected key using a transformation and a secret into a proving key, wherein the proving device is arranged such that neither the proving key nor the verification key is stored in clear, with the exception of storage in transient memory, wherein the transformation is configured such that:
    when the correct secret is provided, the proving key is constructed from the protected key; and
    when an incorrect secret is provided, a different proving key is constructed from the protected key,
    wherein the different proving key has a format of a potentially correct proving key,
    wherein the proving key or different proving key is obtained directly from the transformation, and
    wherein the transformation is at least one of:
    a) a symmetric encryption algorithm using any function of one or more of the secret, the protected key and additional data as a key input,
    b) a symmetric encryption algorithm using any function of one or more of the secret, the protected key and additional data as a data input,
    c) a symmetric encryption algorithm using the secret as a key input and the protected key as a data input,
    d) a symmetric encryption algorithm using the protected key as a key input and the secret as a data input,
    e) adapted to use exclusive OR (XOR), concatenation, symmetric encryption, message authentication code (MAC), hash, pseudo-random function (PRF) of the secret as a key input, and
    f) a hash function, using any function of one or more of the protected key, the secret and additional data as input.

18. A non-transitory computer readable medium storing computer implementable instructions which when implemented by a programmable computer cause the computer to perform a computer implemented method for authenticating a prover to a verifier, the prover being provided with a proving key paired to a verification key registered with the verifier, wherein the proving key is obtained by transforming a protected key and a secret using a transformation,
    wherein the prover stores the protected key and does not store the corresponding proving key nor the corresponding verification key in clear, with the exception of storage in transient memory,
    wherein the transformation is configured such that
    when the correct secret is provided, the proving key is constructed from the protected key and
    when an incorrect secret is provided, a different proving key is constructed from the protected key,
    wherein the different proving key has the format of a potentially correct proving key,
    wherein the proving key or different proving key is obtained directly from the transformation, and
    wherein the transformation is at least one of:
    a) a symmetric encryption algorithm using any function of one or more of the secret, the protected key and additional data as a key input,
    b) a symmetric encryption algorithm using any function of one or more of the secret, the protected key and additional data as a data input,
    c) a symmetric encryption algorithm using the secret as a key input and the protected key as a data input,
    d) a symmetric encryption algorithm using the protected key as a key input and the secret as a data input,
    e) adapted to use exclusive OR (XOR), concatenation, symmetric encryption, message authentication code (MAC), hash, pseudo-random function (PRF) of the secret as a key input, and
    f) a hash function, using any function of one or more of the protected key, the secret and additional data as input.

19. The prover device of claim 17, in combination with a verifier device including a processing unit arranged for determining whether a proving key generated by the prover device is a proving key paired with a verification key registered with the verifier device.

* * * * *